United States Patent [19]

De Sloovere

[11] Patent Number: 5,215,332
[45] Date of Patent: Jun. 1, 1993

[54] QUICK RELEASE SEAT BELT ANCHOR

[75] Inventor: Bernard G. De Sloovere, Rochester Hills, Mich.

[73] Assignee: General Motors Corporation, Detroit, Mich.

[21] Appl. No.: 526,479

[22] Filed: May 21, 1990

[51] Int. Cl.$^5$ .............................................. B60R 22/18
[52] U.S. Cl. ................................ 280/801 R; 403/353; 248/223.1; 297/481; 297/482
[58] Field of Search ............... 280/727, 801, 802, 803, 280/804, 808; 297/468, 469, 481, 482, 483, 485, 486; 403/315, 353; 248/223.1

[56] References Cited

U.S. PATENT DOCUMENTS

| | | | |
|---|---|---|---|
| 2,095,653 | 10/1937 | Tepel | 403/353 X |
| 2,459,658 | 1/1949 | Klein | 248/223.1 X |
| 2,621,357 | 12/1952 | Stuman | 248/223.1 X |
| 3,437,349 | 4/1969 | Feles et al. | 297/482 |
| 3,622,203 | 11/1971 | Steere | 297/385 |
| 3,878,589 | 4/1975 | Schaefer | 403/353 X |
| 3,894,377 | 7/1975 | Welch | 403/353 X |
| 4,065,181 | 12/1977 | Gunlock et al. | 297/452 |
| 4,473,243 | 9/1984 | Ogawa | 280/808 |
| 4,550,933 | 11/1985 | Patterson | 280/808 |
| 4,702,491 | 10/1987 | Meyer | 280/801 |
| 4,725,029 | 2/1988 | Herve | 248/223.1 |
| 4,786,119 | 11/1988 | Smuda | 248/223.1 X |
| 4,915,413 | 4/1990 | Meyer | 280/801 |

FOREIGN PATENT DOCUMENTS

| | | | |
|---|---|---|---|
| 51126 | 5/1982 | European Pat. Off. | 280/801 |
| 88640 | 5/1985 | Japan | 280/801 |
| 88643 | 5/1985 | Japan | 280/801 |

Primary Examiner—Charles A. Marmor
Assistant Examiner—Tamara L. Finlay
Attorney, Agent, or Firm—Raymond I. Bruttomesso, Jr.

[57] ABSTRACT

A seat belt anchor for detachably mounting a seat belt on a bolt has a shank extending axially from a vehicle body panel and a bolt head projecting in a radial direction from the shank. The seat belt anchor has an anchor plate with a keyhole shaped slot including an access portion for receiving the bolt head and a retaining portion which is narrower than the bolt head and further from the seat belt than the access portion for receiving the shank of the belt. The anchor plate is mounted on the bolt when the retaining portion of the keyhole shaped slot is registered with the bolt head. An axially yieldable spring carried by the anchor plate axially engages the bolt head to urge the anchor plate into engagement with the bolt head. A spring and a pair of detent bosses carried by the anchor plate engage with the bolt head to retain the anchor plate radially holding the bolt in the retaining portion of the key hole slot. The anchor plate is detachable from the bolt by depressing the anchor plate axially towards the vehicle body panel as permitted by yielding of the axially yieldable spring to disengage the detent bosses from the bolt head and allow sliding movement of the anchor plate in the radial direction to register the bolt head with the access portion. This allows the detaching of the bolt head through the access portion.

6 Claims, 2 Drawing Sheets

QUICK RELEASE SEAT BELT ANCHOR

The invention relates to a seat belt anchor and more particularly to a seat belt anchor that quickly attaches and detaches from a bolt mounted on a vehicle panel.

BACKGROUND OF THE INVENTION

It is known to mount a seat belt anchor plate on a vehicle. The anchor plate is bolted to the vehicle so that the bolt must be removed from the vehicle to remove the anchor plate.

It is also known to make the seat belt webbing easily detachable from a van type vehicle when the seat is removed from the vehicle. A buckle portion is mounted to the roof rail of the van. A latch plate connected to the seat belt webbing is inserted in the buckle portion of the seat belt anchor. The latch plate and seat belt webbing are removed from the vehicle by unlatching the buckle, leaving only the buckle portion buckle attached to the vehicle.

It is known to use a keyhole shaped slot to anchor a seat belt system to the vehicle body as shown in U.S. Pat. No. 4,473,243. The bolt enters in the larger access portion and is slid to the narrower retaining portion to retain the webbing to the frame. A holder plate must be moved to release the webbing from the frame.

It would be desirable to provide a seat belt anchor which is easily attached and detached to the bolt on the vehicle panel, yet provides means to positively engage the bolt.

SUMMARY OF THE INVENTION

This invention provides a seat belt anchor for detachably mounting a seat belt on a bolt having a shank extending axially from a vehicle body panel and a bolt head projecting in a radial direction from the shank and spaced from the panel by the shank. The seat belt anchor has an anchor plate connected to a seat belt. The anchor plate has a keyhole shaped slot including an access portion for receiving the bolt head when the access portion is registered with the bolt head and a retaining portion which is narrower than the bolt head and further from the seat belt than the access portion for receiving the shank of the belt. The anchor plate is mounted on the bolt when the retaining portion of the keyhole shaped slot is registered with the bolt head. An axially yieldable spring carried by the anchor plate axially engages the bolt head to urge the anchor plate into engagement with the bolt head. A spring and a pair of detent bosses carried by the anchor plate engage with the bolt head to retain the anchor plate radially holding the bolt in the retaining portion of the key hole slot. The anchor plate is detachable from the bolt by depressing the anchor plate axially towards the vehicle body panel as permitted by yielding of the axially yieldable spring to disengage the detent bosses from the bolt head and allow sliding movement of the anchor plate in the radial direction to register the bolt head with the access portion. This allows the detaching of the bolt head through the access portion.

One object, feature and advantage of this invention is a seat belt anchor with springs and detents bosses which allow self latching and retaining to the bolt.

Another object, feature and advantage of this invention resides in the springs urging the bolt against the anchor plate to reduce rattle.

Further objects, features and advantages of the present invention will become apparent to those skilled in the art as the nature of the invention is better understood from the accompanying drawings and detailed description.

DESCRIPTION OF THE PREFERRED EMBODIMENT

Figure 1:
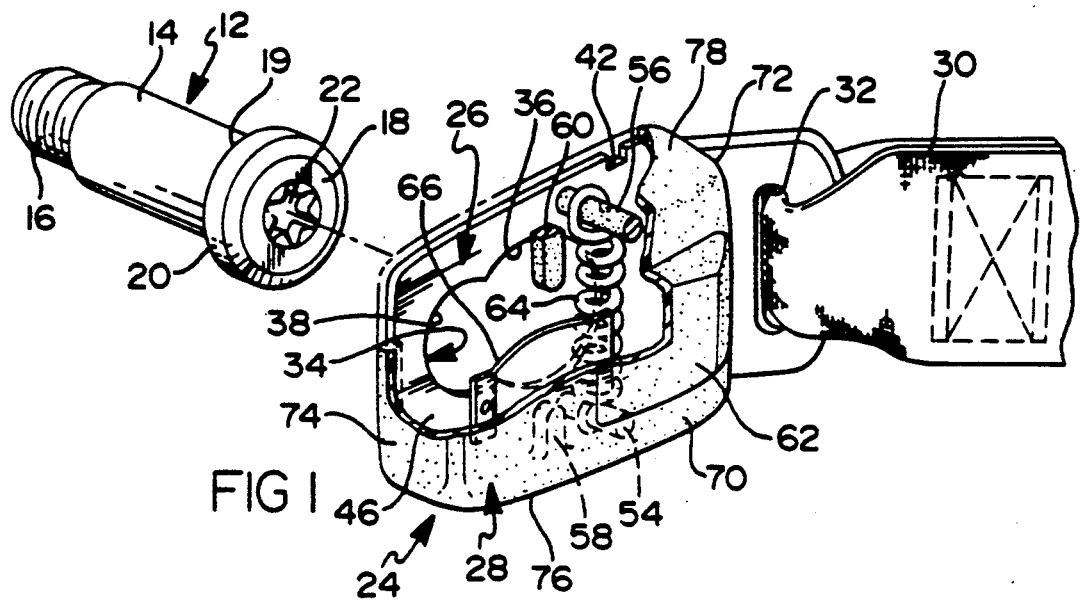
FIG. 1 is a perspective view showing the seat belt anchor detached from the bolt.
Figure 3:
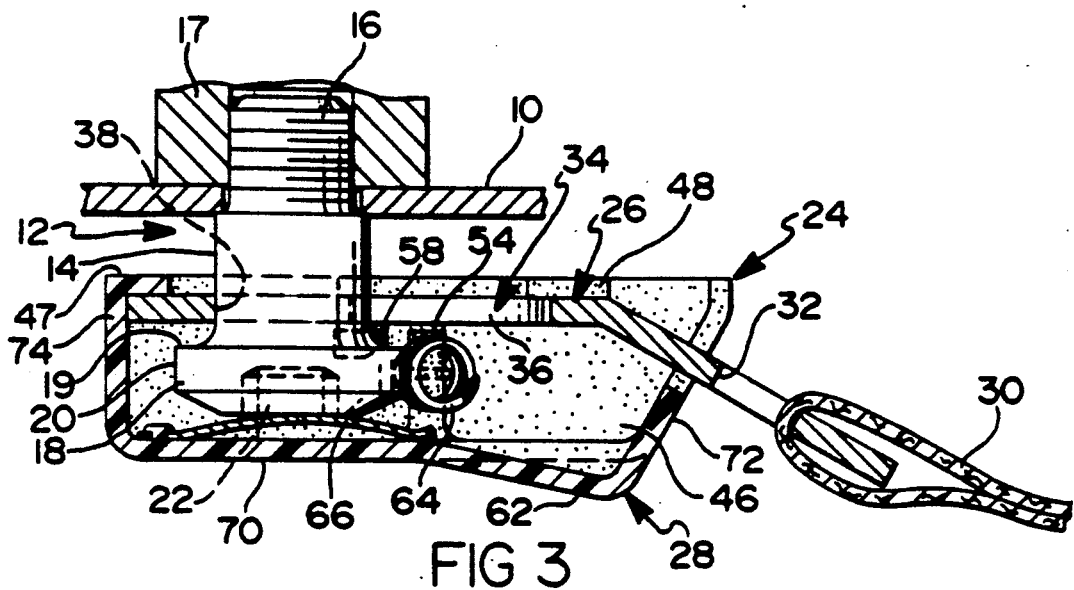
FIG. 3 is a sectional view taken in the direction of arrows 3—3 of FIG. 2 and showing the seat belt anchor with the bolt head in the retained position.

As best seen in FIG. 1, a bolt 12 has a shank 14 with a threaded portion 16. A bolt head 18 projects radially from the shank 14 and is on the opposite end of the shank 14 from the threaded portion 16. The bolt head 18 has an underside 19, an edge 20 and a screwdriver grooved portion 22. The threaded portion 16 threads into a nut 17 carried by a body panel 10 as shown in FIG. 3.

Figure 2:
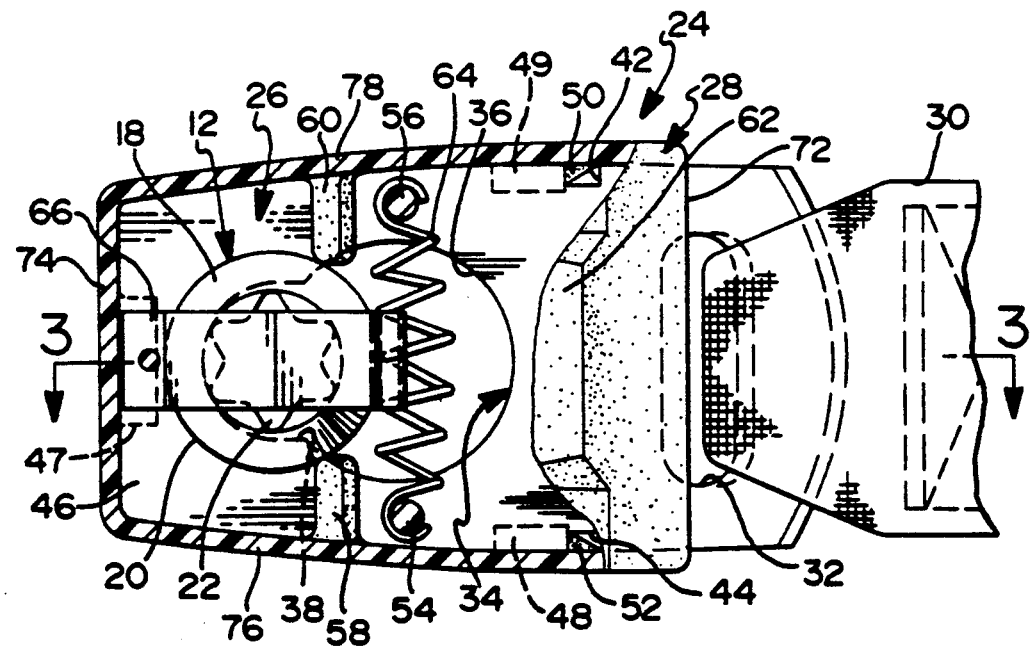
FIG. 2 is an elevation view having parts broken away and in section showing the seat belt anchor with the bolt head in the retained position.

A seat belt anchor 24 has an anchor plate 26, a cover 28 and a seat belt webbing 30. The anchor plate 26, a metal stamping, as seen in FIG. 1 has a seat belt slot 32 for receiving the seat belt webbing 30. A keyhole shaped slot 34 has an access portion 36 and a retaining portion 38. The anchor plate 26 is bent resulting in the seat belt slot 32 and the keyhole shaped slot 34 being on different planes. The access portion 36 is wider than the bolt head 18 to allow the bolt head 18 to pass through the access portion 36. The retaining portion 38 is narrower than the bolt head 18 and is located further from the seat belt slot 32 than the access portion 36. FIG. 2 shows a pair of slots 42 and 44 cut into the opposite side edges of the anchor plate 26 which are used for attaching the cover 28 as will be described below.

The cover 28, made of a molded plastic, has a planar surface 70 spaced apart from the anchor plate 26 by four side walls 72, 74, 76 and 78. An opening 46 is defined between the planar surface 70 and the anchor plate 26. A series of tabs 47, 48 and 49 as best seen in FIG. 3 are used for guiding the cover 28 over the anchor plate 26. A pair of tangs 50 and 52, FIG. 2, engage into the slots 42 and 44 in the anchor plate 26 to retain the cover 28 to the anchor plate 26. FIG. 1 shows a pair of posts 54 and 56 molded as part of the cover 28 and positioned so that they are on opposite sides of the access portion 36 of the keyhole shaped slot 34. A pair of detent bosses 58 and 60 are also molded as part of the cover 28 and are also positioned on opposite sides of the access portion 36 of the keyhole shaped slot 34 so that when the bolt 12 is in the retaining portion 38, FIG. 2, the edge 20 of the bolt head 18 engages the detent bosses 58 and 60 as further described below. The cover 28 also has a locally raised boss 62 on the planar surface 70 on the opposite side from the opening as best seen in FIG. 1 giving the operator a better surface to grasp when attaching and detaching of the seat belt anchor 24 from the bolt 12.

A latch spring 64 is mounted between the posts 54 and 56 and is suspended above the access portion 36 of the keyhole shaped slot 34 as seen in FIG. 1. The latch spring 64 retains the bolt 12 in the retaining portion 38 of the keyhole shaped slot 34 as shown in FIG. 2 and imposes a slight radial force on the bolt head 18 when the bolt 12 is the retaining portion 38.

FIG. 3 shows a leaf spring 66 which is mounted in the opening 46 on the planar surface 70 of the cover 28 directly above the retaining portion 38 and part of the access portion 36 of the keyhole shaped slot 34. The leaf spring 66 engages the bolt head 18, to urge the anchor plate 26 in engagement with the underside 19 of the bolt head 18. Rattling associated with movement of the vehicle body 10 is eliminated by the snug fit of the bolt head 18 between the anchor plate 26 and the leaf spring 66.

Figure 4:
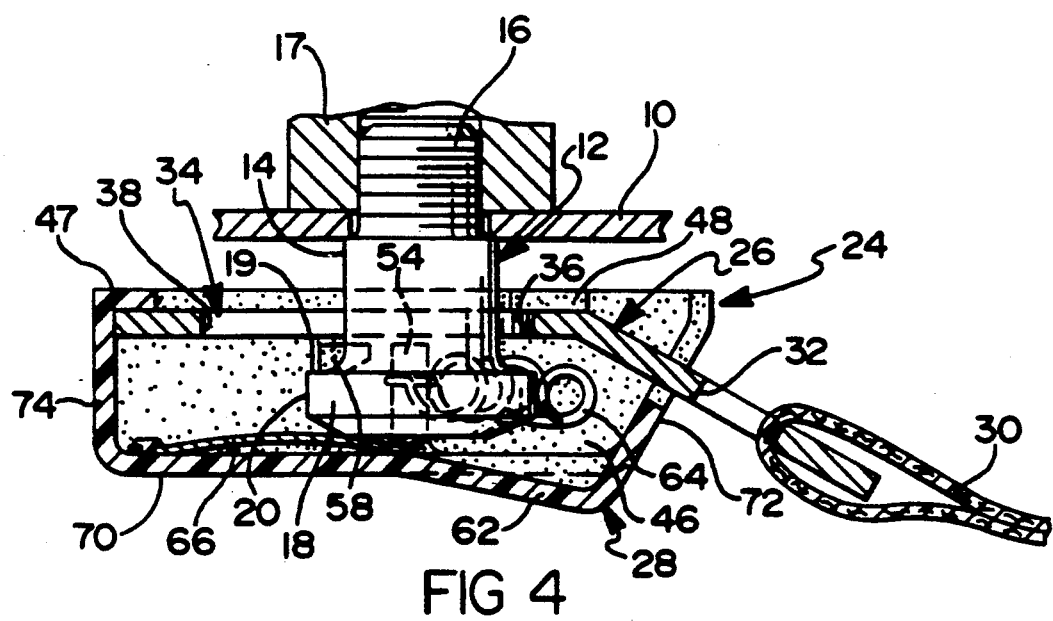
FIG. 4 is a sectional view similar to FIG. 3 but showing the seat belt anchor with the bolt head in the access position.

The seat belt anchor 24 as shown in FIG. 1 is attached to the bolt 12 by first angling the seat belt anchor 24 and positioning the seat belt anchor 24 relative to the bolt head 18 so that part of the edge 20 of the bolt head 18 passes through the access portion 36 and engages the latch spring 64. The seat belt anchor 24 is moved radially leftwardly and axially towards the bolt 12 in the same motion allowing the whole bolt head 18 to pass through the access portion 36 of the keyhole shaped slot 34. At the same time the edge 20 of the bolt head 18 is deflecting the latch spring 64 towards the seat belt slot 32 to permit the bolt head 18 to enter the opening 46 as shown in FIG. 4. When the entire bolt head 18 has passed through the access portion 36, the cover 28 of the seat belt anchor 24 continues to be pushed axially towards the vehicle body 10 yielding the leaf spring 66. The cover 28 and the anchor plate 26 are then pushed radially rightwardly to the position of FIG. 3, so that the bolt 12 enters the retaining portion 38. The latch spring 64 returns to the position shown in FIG. 2, as the detent bosses 58 and 60 pass under the bolt head 18 and the retaining portion 38 moves around the shank of the bolt 12. The leaf spring 66 urges the anchor plate 26 against the underside 19 of the bolt head 18 when the force placed on the cover 28 by the operator which had yielded the leaf spring 66 is eliminated. The detent bosses 58 and 60 and the latch spring 64 engage the edge 20 of the bolt head 18 preventing the seat belt anchor 24 from moving radially relative to the bolt 12 in a direction where the bolt head 18 would register with the access portion 36 of the keyhole shaped slot 34. The seat belt anchor 24 can rotate about the bolt 12.

To unlatch the seat belt anchor 24 from the latched position of FIG. 3, the cover 28 is depressed towards the vehicle body 10 yielding the leaf spring 66. The seat belt anchor 24 moves relative to bolt head 18 disengaging the detent bosses 58 and 60 from the edge 20 of the bolt head 18. With the detent bosses 58 and 60 free from engagement with the bolt head 18, the cover 28 may be moved radially leftwardly, allowing the detent bosses 58 and 60 to pass under the bolt head 18, to a position where the access portion 36 registers with the bolt head 18 as shown in FIG. 3. The latch spring 64 at the same time is deflected towards the seat belt slot 32 as shown in FIG. 3. The seat belt anchor 24 is lifted away from the bolt 12 and the body panel 10.

While one embodiment of the present invention has been explained, various modifications within the the spirit and scope of the following claims will be readily apparent to those skilled in the art.

The embodiments of the invention in which an exclusive property or privilege is claimed are defined as follows:

1. A seat belt anchor for detachably mounting a seat belt on a bolt having a shank extending axially from a vehicle body panel and a bolt head projecting in a radial direction from the shank and spaced from the panel by the shank, the seat belt anchor comprising:

an anchor plate connected to the seat belt and having a keyhole shaped slot including an access portion for receiving the bolt head when the access portion is registered with the head, and a retaining portion which is narrower than the head of the bolt and further from the seat belt than the access portion for receiving the shank of the bolt and mounting the anchor plate on the bolt when the retaining portion is registered with the head;

yieldable axial retention means carried by the anchor plate axially engageable with the bolt head to urge the anchor plate into engagement with the bolt head; and radial yielding spring carried by the anchor plate and yieldable engageable with the bolt head to retain the anchor plate radially for holding the bolt in the retaining portion of the keyhole slot, whereby the anchor plate is detachable from the bolt by depressing the anchor plate axially toward the vehicle body panel yielding the yieldable axial retention means and the radial yielding spring allowing sliding movement of the anchor plate in the radial direction, the bolt head to be registered with the access portion to allow the detaching of the bolt head through the access portion.

2. A seat belt anchor for detachably mounting a seat belt on a bolt having a shank extending axially from a vehicle body panel and a bolt head projecting in a radial direction from the shank and spaced from the panel by the shank, the seat belt anchor comprising:

an anchor plate connected to the seat belt and having a keyhole shaped slot including an access portion for receiving the bolt head when the access portion is registered with the head, and a retaining portion which is narrower than the head portion of the bolt and further from the seat belt than the access portion for receiving the shank of the bolt and mounting the anchor plate on the bolt when the retaining portion is register with the head;

a cover retained by the anchor plate having a pair of detent bosses projecting axially toward the anchor plate engageable with the bolt head to retain the anchor plate radially for holding the bolt in the retaining portion of the keyhole slot, and a pair of posts projecting axially toward the anchor plate and register on opposing edges of the access portion of the keyhole shaped slot;

an extension spring mounted between the pair of posts register over the access portion of the keyhole slot engageable with the bolt head to retain the anchor plate radially for holding the bolt in the retaining portion of the keyhole slot; and a leaf spring mounted on the the cover axial between the cover and the keyhole shaped slot in the anchor plate engageable with the bolt head to urge the anchor plate into engagement with the bolt head, the anchor plate being detachable from the bolt by depressing the anchor plate axially toward the vehicle body panel yielding the leaf spring and disengaging the bolt head from the detent bosses and then sliding the anchor plate radially yielding the extension spring allowing the head of the bolt to be registered with the access portion to allow the detaching of the bolt head through the access portion.

3. A seat belt anchor for detachably mounting a seat belt on a bolt having a shank extending axially from a vehicle body panel and a bolt head projecting in a radial direction from the shank and spaced from the panel by the shank, the seat belt anchor comprising:

an anchor plate having a seat belt slot towards one end for connecting the seat belt and having a keyhole shaped slot near the other end including an access portion for receiving the bolt head and a retaining portion which is narrower than the bolt head and further from the seat belt slot than the access portion for retaining the shank of the bolt and a pair of notches cut on a pair of opposite edges of the anchor plate;

a cover having a pair of tangs on a pair of sides for engaging the notches in the anchor plate for retaining the cover to the anchor plate, an opening define by a planar surface of the cover and the the anchor plate, the cover having a pair of detent bosses projecting in to the opening for engagement with the bolt head to retain the anchor plate radially for holding the bolt in the retaining portion of the keyhole slot, a pair of post projected into the opening;

an extension spring mounted between the pair of posts register over the access portion of the keyhole slot engageable with the bolt head to retain the anchor plate radially for holding the bolt in the retaining portion of the keyhole slot; and a leaf spring mounted on the the cover axial between the cover and the keyhole shaped slot in the anchor plate engageable with the bolt head to urge the anchor plate into engagement with the bolt head, the anchor plate being detachable from the bolt by depressing the anchor plate axially toward the vehicle body panel yielding the leaf spring and disengaging the bolt head from the detent bosses and then sliding the anchor plate radially yielding the extension spring allowing the head of the bolt to be registered with the access portion to allow the detaching of the bolt head through the access portion.

4. A seat belt anchor according to claim 3 wherein the anchor plate is bent so that the keyhole slot is not in the same plane as the seat belt slot.

5. A seat belt anchor according to claim 3 wherein the cover has a locally raised boss portion to assist the attaching the bolt to the seat belt anchor.

6. A seat belt anchor according to claim 3 wherein the cover has a plurality of tabs on the edges for guiding the cover over the anchor plate.

* * * * *